(12) United States Patent
Wodrich et al.

(10) Patent No.: US 12,007,476 B2
(45) Date of Patent: Jun. 11, 2024

(54) METHOD FOR DETECTING OBJECTS VIA A VEHICULAR SENSING SYSTEM

(71) Applicant: Magna Electronics Inc., Auburn Hills, MI (US)

(72) Inventors: Helmut A. H. Wodrich, Clarkston, MI (US); Deniz B. Gunel, Clawson, MI (US); James W. Reynolds, III, Lapeer, MI (US)

(73) Assignee: Magna Electronics Inc., Auburn Hills, MI (US)

( * ) Notice: Subject to any disclaimer, the term of this patent is extended or adjusted under 35 U.S.C. 154(b) by 96 days.

(21) Appl. No.: 17/930,785

(22) Filed: Sep. 9, 2022

(65) Prior Publication Data

US 2023/0080530 A1      Mar. 16, 2023

Related U.S. Application Data (60) Provisional application No. 63/261,111, filed on Sep. 13, 2021.

(51) Int. Cl.
| | |
|---|---|
| *G01S 15/00* | (2020.01) |
| *G01S 15/42* | (2006.01) |
| *G01S 15/931* | (2020.01) |

(52) U.S. Cl.
CPC ............ *G01S 15/931* (2013.01); *G01S 15/42* (2013.01); *G01S 2015/938* (2013.01); *G01S 2015/939* (2013.01)

(58) Field of Classification Search
CPC .. G01S 15/931; G01S 15/42; G01S 2015/938; G01S 2015/939

USPC ........................................................... 367/93
See application file for complete search history.

(56) References Cited

U.S. PATENT DOCUMENTS

| | | | |
|---|---|---|---|
| 5,767,793 | A | 6/1998 | Agravante et al. |
| 5,949,331 | A | 9/1999 | Schofield et al. |
| 6,587,186 | B2 | 7/2003 | Bamji et al. |
| 6,674,895 | B2 | 1/2004 | Rafii et al. |
| 6,678,039 | B2 | 1/2004 | Charbon |
| 6,690,268 | B2 | 2/2004 | Schofield et al. |
| 6,690,354 | B2 | 2/2004 | Sze |
| 6,693,517 | B2 | 2/2004 | McCarthy et al. |
| 6,710,770 | B2 | 3/2004 | Tomasi et al. |
| 6,825,455 | B1 | 11/2004 | Schwarte |

(Continued)

FOREIGN PATENT DOCUMENTS

WO       2011090484 A1      7/2011

*Primary Examiner* — Tai T Nguyen
(74) *Attorney, Agent, or Firm* — HONIGMAN LLP (57) ABSTRACT

A vehicular sensing system includes a first set of first sensors disposed at a first rear portion of a vehicle. The system includes a second set of second sensors disposed at a second rear portion of the vehicle that is above the first rear portion of the vehicle. A respective first field of sensing of at least one first sensor at least partially overlaps a respective second field of sensing of at least one second sensor. The system includes an electronic control unit (ECU) for processing sensor data to detect objects that are located within the at least partially overlapping fields of sensing of the at least one first sensor and the at least one second sensor. The vehicular sensing system, responsive to detecting the objects that are located within the at least partially overlapping fields of sensing, determines three-dimensional locations of the detected objects relative to the vehicle.

23 Claims, 7 Drawing Sheets

(56) References Cited

U.S. PATENT DOCUMENTS

| | | |
|---|---|---|
| 6,876,775 B2 | 4/2005 | Torunoglu |
| 6,906,793 B2 | 6/2005 | Bamji et al. |
| 6,919,549 B2 | 7/2005 | Bamji et al. |
| 7,053,357 B2 | 5/2006 | Schwarte |
| 7,157,685 B2 | 1/2007 | Bamji et al. |
| 7,176,438 B2 | 2/2007 | Bamji et al. |
| 7,203,356 B2 | 4/2007 | Gokturk et al. |
| 7,212,663 B2 | 5/2007 | Tomasi |
| 7,283,213 B2 | 10/2007 | O'Connor et al. |
| 7,310,431 B2 | 12/2007 | Gokturk et al. |
| 7,321,111 B2 | 1/2008 | Bamji et al. |
| 7,340,077 B2 | 3/2008 | Gokturk et al. |
| 7,352,454 B2 | 4/2008 | Bamji et al. |
| 7,375,803 B1 | 5/2008 | Bamji |
| 7,379,100 B2 | 5/2008 | Gokturk et al. |
| 7,379,163 B2 | 5/2008 | Rafii et al. |
| 7,405,812 B1 | 7/2008 | Bamji |
| 7,408,627 B2 | 8/2008 | Bamji et al. |
| 7,580,795 B2 | 8/2009 | McCarthy et al. |
| 8,013,780 B2 | 9/2011 | Lynam |
| 8,027,029 B2 | 9/2011 | Lu et al. |
| 8,665,079 B2 | 3/2014 | Pawlicki et al. |
| 8,698,894 B2 | 4/2014 | Briggance |
| 9,036,026 B2 | 5/2015 | Dellantoni et al. |
| 9,146,898 B2 | 9/2015 | Ihlenburg et al. |
| 9,193,321 B2 | 11/2015 | Dingman |
| 9,524,597 B2 | 12/2016 | Ricci |
| 9,575,160 B1 | 2/2017 | Davis et al. |
| 9,586,138 B2 | 3/2017 | Wei et al. |
| 9,599,702 B1 | 3/2017 | Bordes et al. |
| 9,689,967 B1 | 6/2017 | Stark et al. |
| 9,753,121 B1 | 9/2017 | Davis et al. |
| 9,869,762 B1 | 1/2018 | Alland et al. |
| 9,954,955 B2 | 4/2018 | Davis et al. |
| 9,977,593 B2 | 5/2018 | Ricci |
| 10,004,458 B2 | 6/2018 | Toth et al. |
| 10,768,298 B2 | 9/2020 | Wodrich et al. |
| 10,866,306 B2 | 12/2020 | Maher et al. |
| 11,275,175 B2 | 3/2022 | Wodrich et al. |
| 11,454,719 B2 | 9/2022 | Hess et al. |
| 11,520,027 B2 * | 12/2022 | Suchy .................. G01S 15/931 |
| 2003/0034883 A1 | 2/2003 | Sato et al. |
| 2004/0239509 A1 * | 12/2004 | Kisacanin ............. G01S 13/878 |
| | | 340/575 |
| 2006/0139181 A1 | 6/2006 | Danz et al. |
| 2006/0206243 A1 | 9/2006 | Pawlicki et al. |
| 2008/0211708 A1 | 9/2008 | Haberland et al. |
| 2009/0147083 A1 | 6/2009 | Pawlicki et al. |
| 2009/0242310 A1 | 10/2009 | Touge |
| 2010/0001897 A1 | 1/2010 | Lyman |
| 2010/0002081 A1 | 1/2010 | Pawlicki et al. |
| 2010/0245066 A1 | 9/2010 | Sarioglu et al. |
| 2011/0103650 A1 | 5/2011 | Cheng et al. |
| 2012/0062743 A1 | 3/2012 | Lynam et al. |
| 2012/0218412 A1 | 8/2012 | Dellantoni et al. |
| 2013/0063600 A1 | 3/2013 | Pawlicki et al. |
| 2013/0093613 A1 | 4/2013 | Itoh et al. |
| 2013/0215271 A1 | 8/2013 | Lu |
| 2013/0222592 A1 | 8/2013 | Gieseke |
| 2014/0218529 A1 | 8/2014 | Mahmoud et al. |
| 2014/0219506 A1 | 8/2014 | Foltin |
| 2014/0375476 A1 | 12/2014 | Johnson et al. |
| 2015/0124096 A1 | 5/2015 | Koravadi |
| 2015/0138011 A1 | 5/2015 | Hiramaki et al. |
| 2015/0158499 A1 | 6/2015 | Koravadi |
| 2015/0185319 A1 | 7/2015 | Matsuura et al. |
| 2015/0251599 A1 | 9/2015 | Koravadi |
| 2015/0352953 A1 | 12/2015 | Koravadi |
| 2016/0036917 A1 | 2/2016 | Koravadi et al. |
| 2016/0098612 A1 | 4/2016 | Viviani |
| 2016/0200240 A1 | 7/2016 | Quinlan et al. |
| 2016/0210853 A1 | 7/2016 | Koravadi |
| 2017/0129489 A1 | 5/2017 | Pawlicki et al. |
| 2017/0205506 A1 | 7/2017 | Voorheis et al. |
| 2017/0212231 A1 | 7/2017 | Iwai et al. |
| 2017/0222311 A1 | 8/2017 | Hess et al. |
| 2017/0254873 A1 | 9/2017 | Koravadi |
| 2017/0276788 A1 | 9/2017 | Wodrich |
| 2017/0285161 A1 | 10/2017 | Izzat et al. |
| 2017/0315231 A1 | 11/2017 | Wodrich |
| 2017/0356994 A1 | 12/2017 | Wodrich et al. |
| 2018/0015875 A1 | 1/2018 | May et al. |
| 2018/0045812 A1 | 2/2018 | Hess |
| 2018/0059236 A1 | 3/2018 | Wodrich et al. |
| 2018/0065623 A1 | 3/2018 | Wodrich et al. |
| 2018/0067194 A1 | 3/2018 | Wodrich et al. |
| 2018/0074191 A1 | 3/2018 | Bilik et al. |
| 2018/0105176 A1 | 4/2018 | Pawlicki et al. |
| 2018/0231635 A1 | 8/2018 | Woehlte |
| 2018/0231657 A1 | 8/2018 | Woehlte |
| 2018/0299533 A1 | 10/2018 | Pliefke et al. |
| 2019/0061760 A1 | 2/2019 | Pawlicki et al. |
| 2019/0072666 A1 | 3/2019 | Duque Biarge et al. |
| 2019/0072667 A1 | 3/2019 | Duque Biarge et al. |
| 2019/0072668 A1 | 3/2019 | Duque Biarge et al. |
| 2019/0072669 A1 | 3/2019 | Duque Biarge et al. |
| 2019/0120951 A1 | 4/2019 | Fischer |
| 2019/0154823 A1 * | 5/2019 | Insana ................... G01S 13/931 |
| 2019/0217775 A1 | 7/2019 | May et al. |
| 2019/0339382 A1 | 11/2019 | Hess et al. |
| 2020/0200898 A1 * | 6/2020 | Hustava ................. G01S 7/536 |
| 2021/0405156 A1 * | 12/2021 | Barber ................... G01S 17/86 |
| 2022/0227366 A1 | 7/2022 | Shah |

\* cited by examiner

METHOD FOR DETECTING OBJECTS VIA A VEHICULAR SENSING SYSTEM

CROSS REFERENCE TO RELATED APPLICATION

The present application claims the filing benefits of U.S. provisional application Ser. No. 63/261,111, filed Sep. 13, 2021, which is hereby incorporated herein by reference in its entirety.

FIELD OF THE INVENTION

The present invention relates generally to a vehicle sensing system for a vehicle and, more particularly, to a vehicle sensing system that utilizes one or more sensors at a vehicle to provide a field of sensing around the vehicle.

BACKGROUND OF THE INVENTION

It is known to provide sensors, such as ultrasonic sensors, at a rear bumper of a vehicle for sensing objects at the ground behind the vehicle.

SUMMARY OF THE INVENTION

A vehicular sensing system utilizes one or more sensors (e.g., ultrasonic sensors) to capture sensor data exterior of a vehicle. The system includes a first set of sensors disposed at a first rear portion of a vehicle equipped with the vehicular sensing system. The first set of sensors includes a plurality of first sensors and each first sensor of the first set of sensors has a respective first field of sensing that extends exterior and at least rearward of the vehicle. The system includes a second set of sensors disposed at a second rear portion of the vehicle that is above the first rear portion of the vehicle. The second set of sensors includes a plurality of second sensors and each second sensor of the second set of sensors has a respective second field of sensing that extends exterior and at least rearward of the vehicle. The respective first field of sensing of at least one first sensor of the plurality of first sensors at least partially overlaps the respective second field of sensing of at least one second sensor of the plurality of second sensors. The system includes an electronic control unit (ECU) with electronic circuitry and associated software. The electronic circuitry of the ECU includes a data processor for (i) processing sensor data captured by first sensors of the first set of sensors and (ii) processing sensor data captured by second sensors of the second set of sensors to detect presence of objects exterior and at least rearward of the vehicle. The vehicular sensing system, responsive at least in part to processing at the ECU of sensor data captured by the first sensors of the first set of sensors and by the second sensors of the second set of sensors, detects objects that are located within the at least partially overlapping fields of sensing of the at least one first sensor and the at least one second sensor. The vehicular sensing system, responsive to detecting the objects that are located within the at least partially overlapping fields of sensing, determines three-dimensional locations of the detected objects relative to the vehicle.

These and other objects, advantages, purposes and features of the present invention will become apparent upon review of the following specification in conjunction with the drawings.

DESCRIPTION OF THE PREFERRED EMBODIMENTS

A vehicle sensing system operates to capture sensing data exterior of the vehicle and may process the captured data to detect objects at or near the vehicle (e.g., to the rear of the vehicle), such as to assist a driver of the vehicle in maneuvering the vehicle or to assist the driver in parking the vehicle in a parking space. The system includes a processor that is operable to receive sensing data from multiple sensors and to provide an output to a control that, responsive to the output, generates an alert or controls an accessory or system of the vehicle, or highlights or overlays an alert on a display screen (that may be displaying video images captured by a single rearward viewing camera or multiple cameras providing forward, side or 360 degree surround views of the area surrounding the vehicle during a reversing or low speed maneuver of the vehicle).

Figure 1:
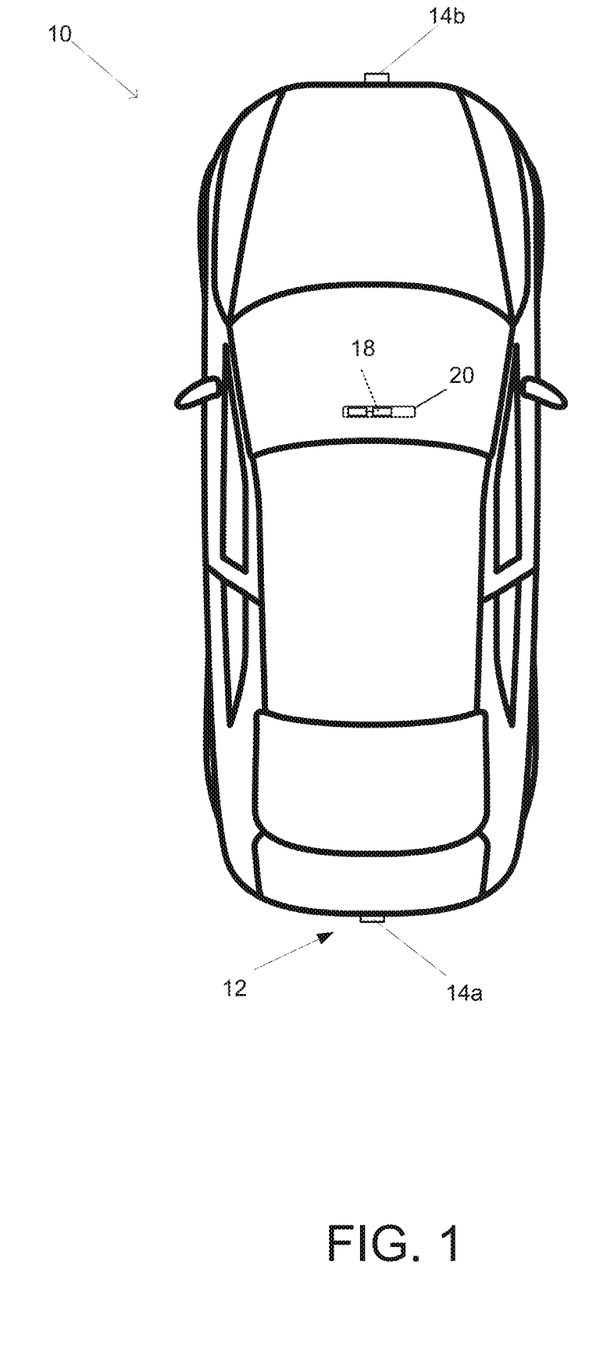
FIG. 1 is a plan view of a vehicle with a sensing system that incorporates sensors.

Referring now to the drawings and the illustrative embodiments depicted therein, a vehicle 10 includes a sensing system 12 that includes at least one exterior sensing sensor, such as an ultrasonic sensor 14a (and the system may optionally include multiple exterior sensing sensors, such as a forward sensing sensor 14b at the front of the vehicle), which senses objects exterior of the vehicle (FIG. 1). The sensing system 12 includes a control or electronic control unit (ECU) 18 having electronic circuitry and associated software, with the electronic circuitry including a data processor or image processor that is operable to process image data captured by the sensor(s), whereby the ECU may detect or determine presence of objects or the like. The data transfer or signal communication from the sensor to the ECU may comprise any suitable data or communication link, such as a vehicle network bus or the like of the equipped vehicle.

Figure 2:
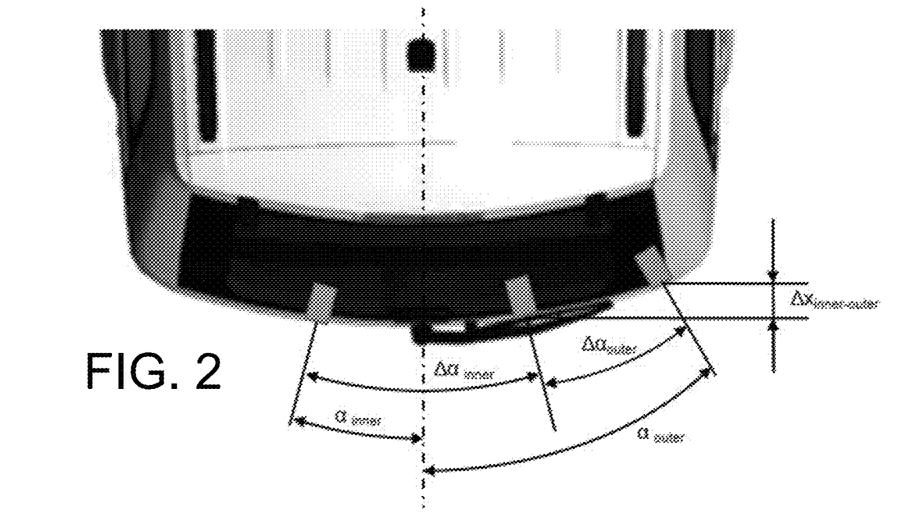
FIGS. 2 and 3 are plan views of conventional sensor placements at a rear of a vehicle.
Figure 3:
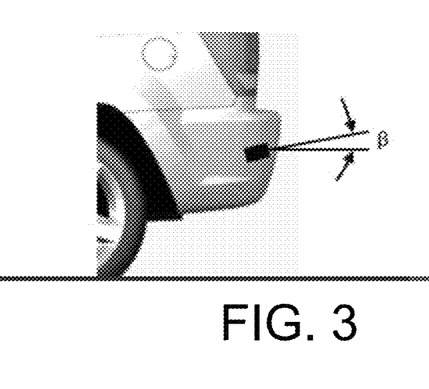

Referring now to FIGS. 2 and 3, known sensor systems for vehicles provide near field coverage in two dimensions (2D) for the side of vehicle. Typically, these systems focus on sensor coverage of a particular side of the vehicle (e.g., a side of the vehicle or a rear of the vehicle). For example, some systems include four to six ultrasonic sensors (or other types of sensors, such as radar sensors or lidar sensors or cameras) that are installed at the rear of the vehicle (e.g., at the bumper and/or fascia of the vehicle) to sense a distance to objects directly behind the vehicle. These sensors are typically limited to detecting or sensing objects low to the ground, such as objects that may collide with the bumper of the vehicle when the vehicle is reversing.

Figure 4:
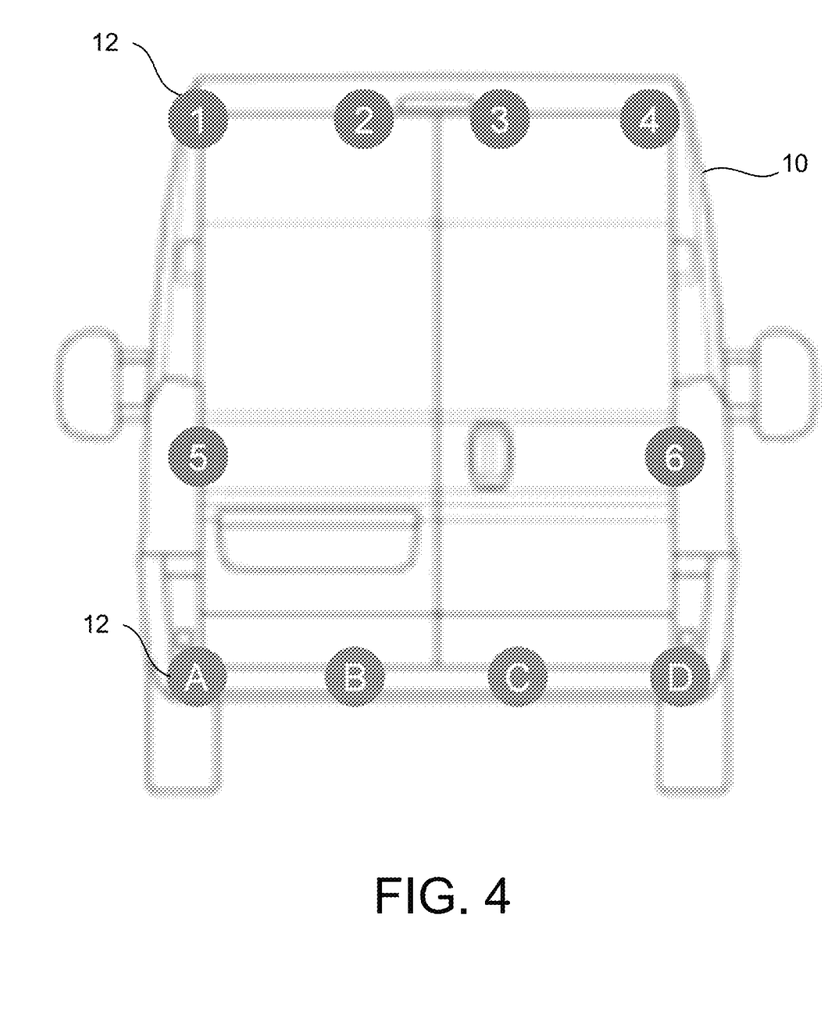
FIG. 4 is a plan view of a rear of a vehicle with multiple sensors distributed around a rear of the vehicle.

Referring now to FIG. 4, a rear of a vehicle 10 may be equipped with multiple sensors 12 (e.g., ultrasonic sensors, radar sensors, etc.). Conventional sensor systems may come equipped with the sensors at the locations labeled 'A', 'B', 'C', and 'D' (i.e., the sensors located along the bumper of the vehicle). However, using only these sensors limits the sensing system to detection of only objects in two dimensions and near to the ground. Implementations herein include additional sensors, such as sensors 12 labeled '1', '2', '3', and '4' linearly arranged higher (i.e., further from the ground) than the sensors linearly arranged closer to the ground (e.g., along the bumper). Here, the sensors are disposed along a rear roofline of the vehicle. Optionally, the system includes rear body side sensors 12 (i.e., the sensors labeled '5' and '6' here). The rear body side sensors may be disposed above the sensors A-D (e.g., at the bumper) and below the sensors 1-4 (e.g., at the rear roofline) such as approximately half-way up the vehicle or at or near the same height as the side mirrors.

Each sensor 12 may have a field of sensing that intersects or at least partially overlaps with the field of sensing of one or more other sensors such that reflections of sensing energy transmitted by a single sensor are received by multiple other sensors. Due to the placement of the sensors (e.g., sensors placed along both horizontal and vertical dimensions instead of just a horizontal dimension), the system processes these multiple reflections to localize objects behind the vehicle in three dimensions (3D) (i.e., localize an object relative to an X, Y, and Z axis).

Figure 5:
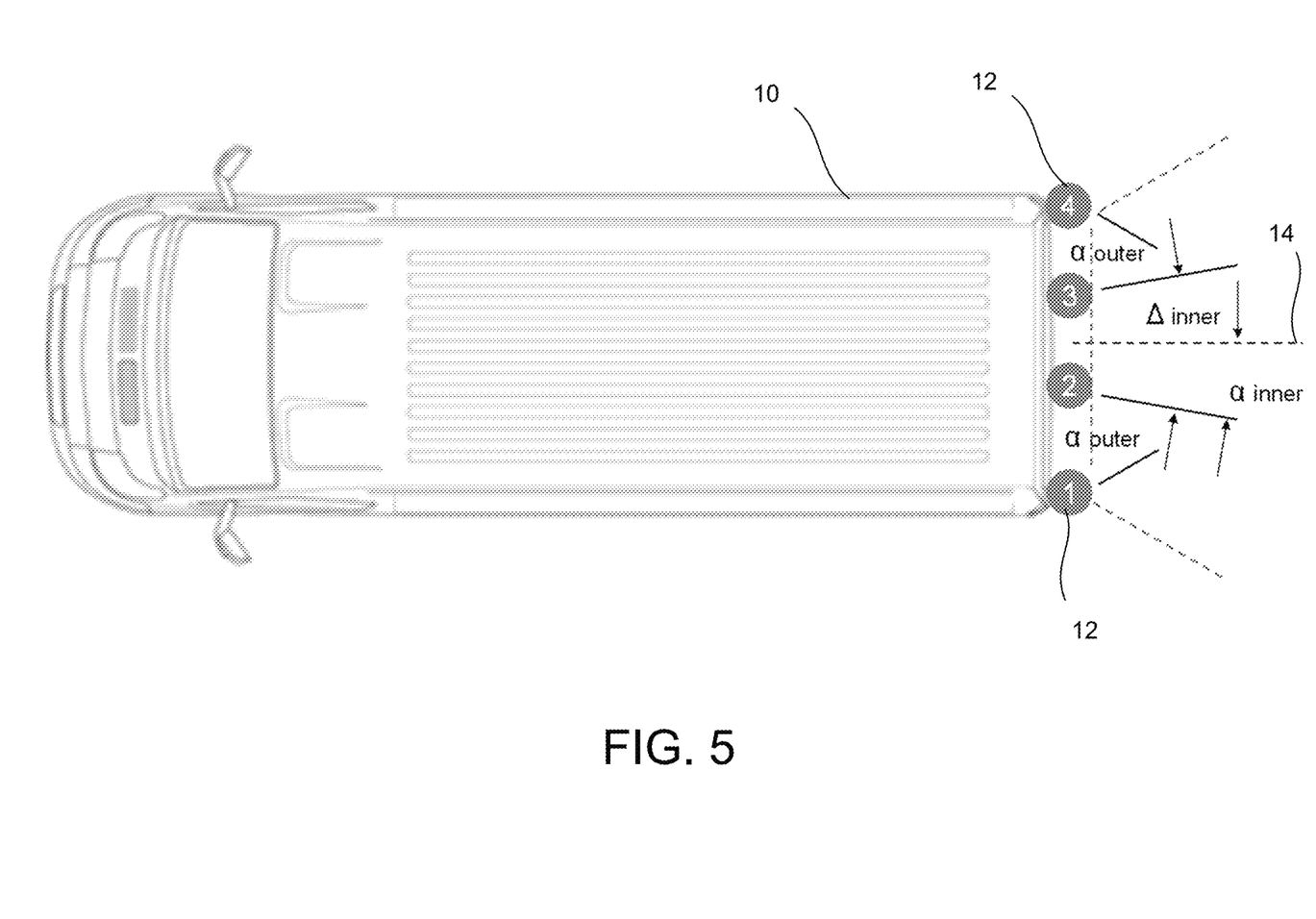
FIG. 5 is a plan view of a top of the vehicle with fields of sensing of a portion of the sensors of FIG. 4.

Referring now to FIG. 5, the field of sensing of the sensors 12 may have different angles relative to the vehicle 10 (e.g., relative to a surface of the vehicle). For example, the outer sensors 12 disposed at or near lateral edges of the rear of the vehicle (e.g., the sensors '1' and '4' and/or sensors '5' and/or '6' and/or sensors 'A' and 'D' of FIG. 4) may be angled inward (i.e., have a field of sensing that is angled toward a midline 14 extending from the center of the vehicle) to intersect or approach an intersection with the rear contour of the vehicle. That is, these sensors may have a field of sensing with a principal axis that extends from the rear of the vehicle with an angle less than 90 degrees and greater than 0 degrees relative to the rear surface or plane of the vehicle. The inner sensors 12 disposed away from the lateral edges of the vehicle and at or near the midline of the vehicle (e.g., sensors '2' and '3' and/or 'B' and 'C' of FIG. 4) may be oriented to have a larger field of sensing in the vertical axis (i.e., a first dimension) and a smaller field of sensing horizontally (i.e., a second dimension) relative to the ground. That is, the field of sensing for the inner sensors may extend vertically (relative to the ground) more than horizontally (i.e., be taller than wide).

Figure 6:
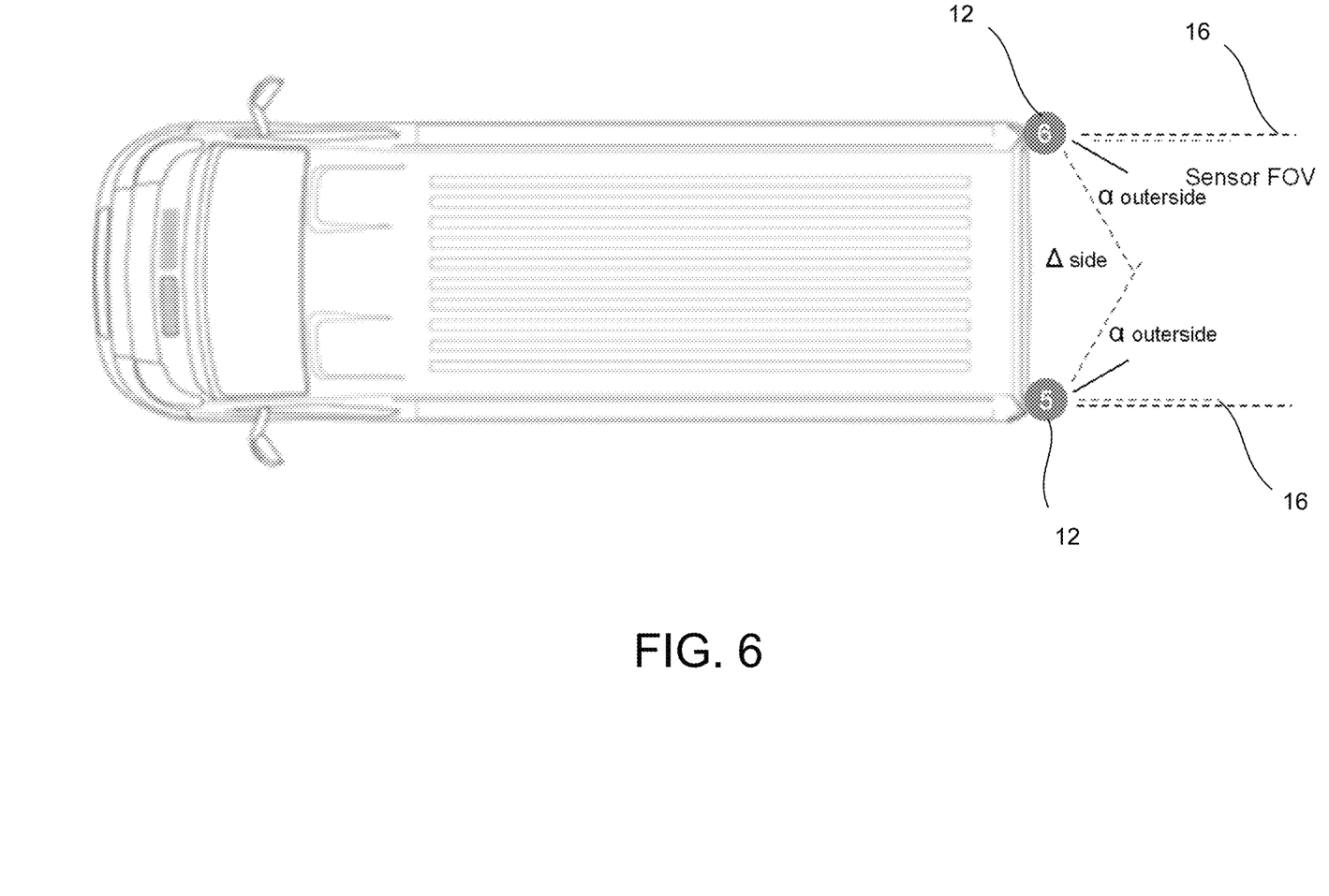
FIG. 6 is a plan view of the of the vehicle with fields of sensing of a different portion of the sensors of FIG. 4.

As shown in FIG. 6, the optional mid side or outer sensors (e.g., the sensors '5' and '6' of FIG. 4) may be angled inward to approach intersection with the rear contour of the vehicle. Optionally, these sensors 12 have a larger field of sensing in the vertical dimension (i.e., perpendicular to the ground) than the horizontal dimension. Optionally, the sensors 12 are calibrated so that the field of sensing has an angle $\alpha$ that minimizes the field of sensing of the sensor outside of the vehicle bodyline. That is, the mid outer sensors may be angled "inward" toward the midline of the vehicle such that the little, if any, of the field of sensing captured by the sensors is outside of lines 16 extending rearward from the rear sides of the vehicle.

Figure 7:
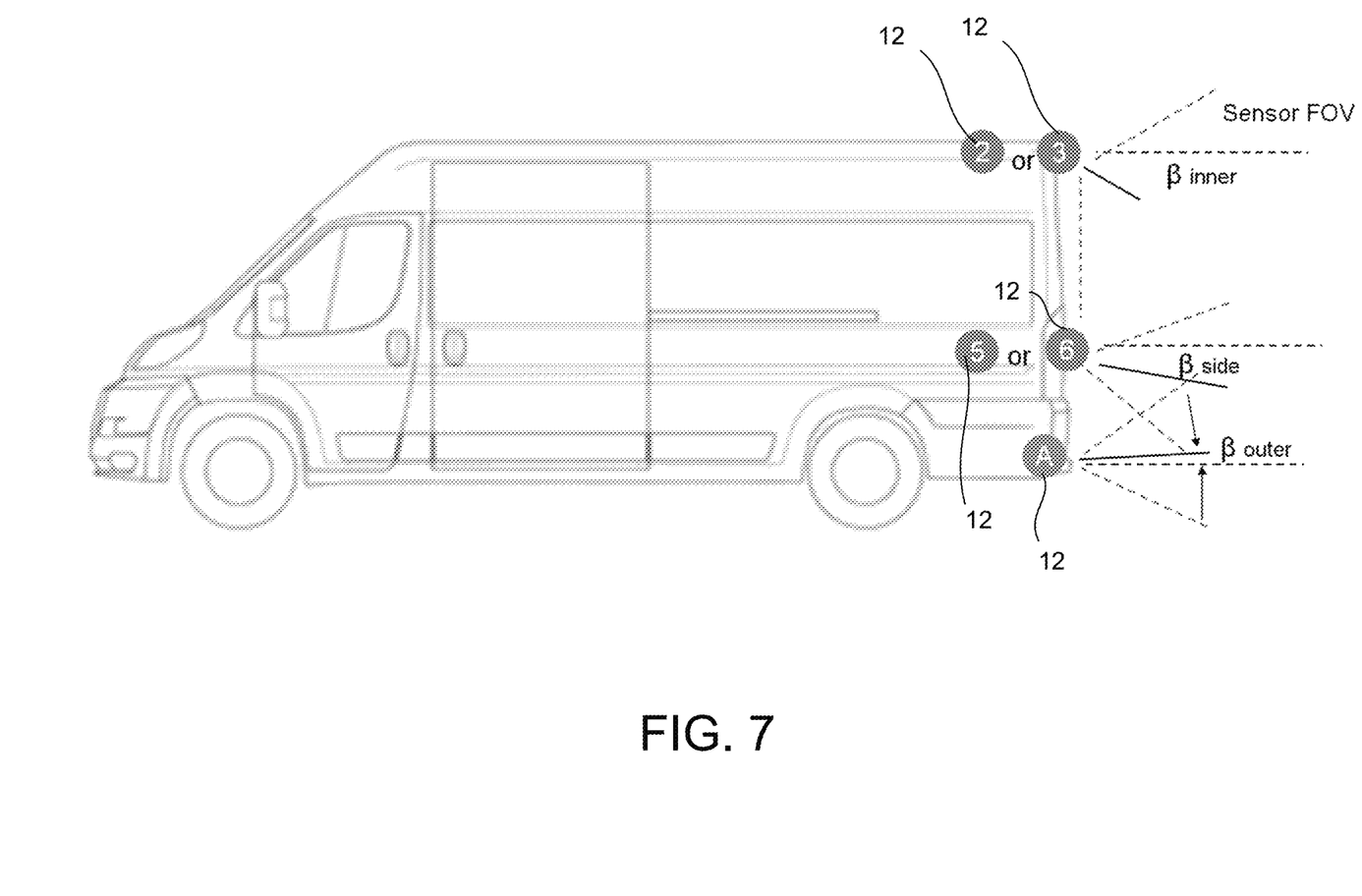
FIG. 7 is a plan view of a side of the vehicle with fields of sensing of a portion of the sensors of FIG. 4.
Figure 8:
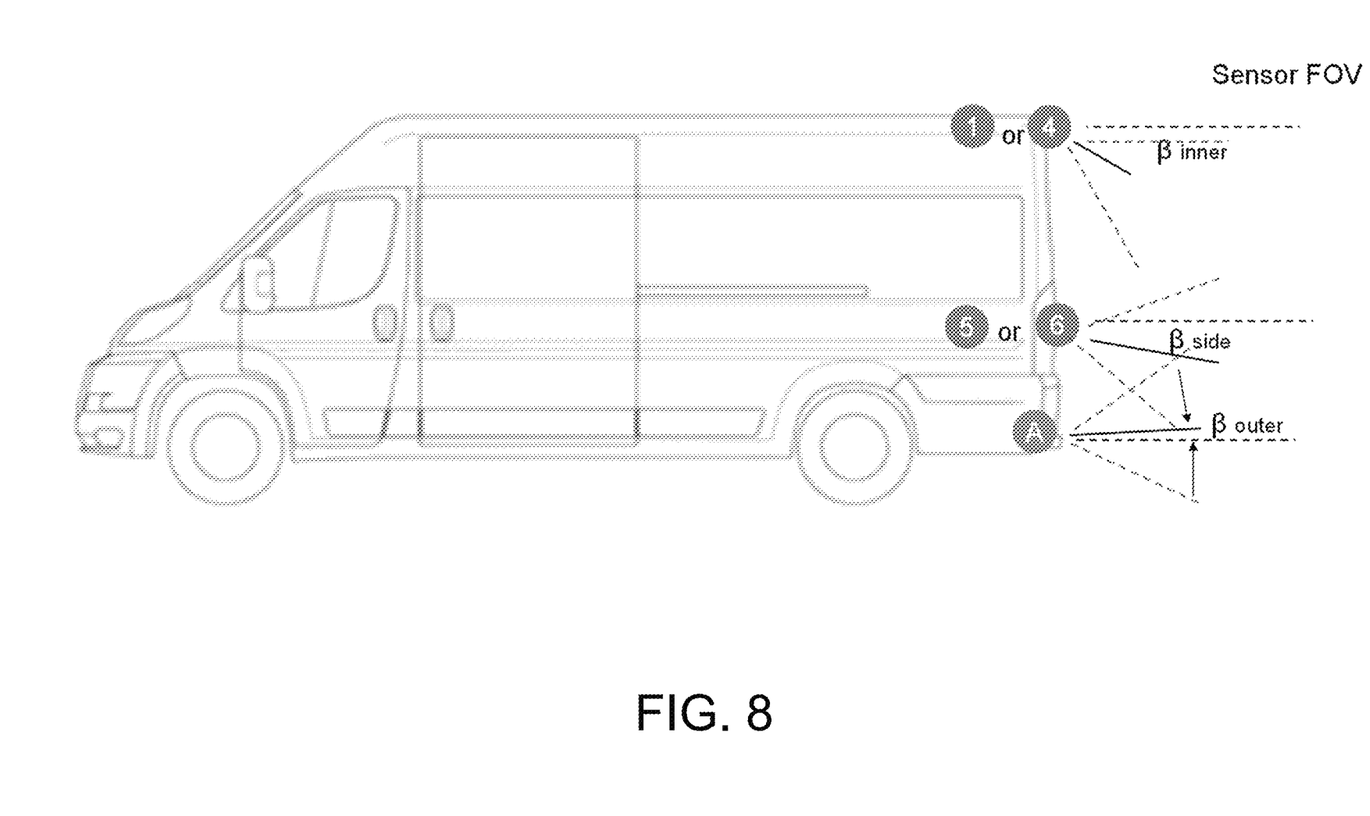
FIG. 8 is a plan view of the side of the vehicle with fields of sensing of a different portion of the sensors of FIG. 4.

Referring now to FIG. 7, the inner sensors (e.g., sensors '2' and '3' and/or 'B' and 'C' of FIG. 4) may be oriented with the larger field of sensing along the vertical axis. That is, the field of sensing is larger in the dimension perpendicular to the ground than the dimension parallel to the ground. The position of the sensors may be selected or calibrated to maximize the coverage behind the vehicle with a preference to include coverage in close proximity to the vehicle. As shown in FIG. 8, the outer sensors 12 (e.g., sensors '1' and '4' and/or sensors '5' and '6' and/or sensors 'A' and 'D' of FIG. 4) may be angled downward (i.e., at angle $\beta$) and inward (i.e., toward a centerline or midline of the vehicle). The sensors 'A' through 'D' and the sensors '1' through '6' may have intersecting or overlapping fields of sensing with one or more other sensors. That is, each of the sensors may have a field of sensing that at least partially overlaps the field of sensing of a different sensor. For example, a sensor disposed at the roofline may have a field of sensing that at least partially overlaps the field of sensing of a sensor disposed at the bumper. Likewise, two sensors disposed at the roofline each have a field of sensing that at least partially overlaps the other sensor and two sensors disposed at or near the bumper may each have a field of sensing that at least partially overlaps the other sensor. The sensing system may utilize aspects of the systems described in U.S. Pat. Nos. 11,275,175 and/or 10,768,298, and/or U.S. Publication No. US-2022-0227366, which are hereby incorporated herein by reference in their entireties.

Thus, the sensing system described herein includes a plurality of sensors (e.g., ultrasonic sensors) disposed at a rear of a vehicle. A first set of sensors includes at least one sensor disposed at or near a bumper of the vehicle (e.g., four sensors disposed linearly along the bumper). The first set of sensors may be approximately linearly arranged along a horizontal line parallel to the ground. That is, each sensor of the first set of sensors may be approximately the same height from the ground. The system includes a second set of sensors (including at least one sensor) disposed at or near a rear roofline of the vehicle (e.g., four sensors disposed linearly along the roofline). The second set of sensors may be approximately linearly arranged along another horizontal line parallel to the ground. That is, each sensor of the second set of sensors may be approximately the same height from the ground. Optionally, additional sensors may be disposed along the rear sides of the vehicle (e.g., above the sensors disposed at the bumper and below the sensors disposed at the roofline). Each sensor has a field of sensing that overlaps with the field of sensing of at least one other sensor. One or more sensors may have a field of sensing that at least partially overlaps two other sensors. Based on the overlapping fields of sensing (e.g., using triangulation), the system detects the presence of objects rear of the vehicle in three dimensions (i.e., relative to an X axis, a Y axis, and a Z axis of the vehicle). Each sensor, depending on its respective location at the vehicle, may have a respective field of sensing with a vertical component that is larger than a horizontal component or vice versa.

The sensing system may utilize aspects of the systems described in U.S. Pat. Nos. 10,866,306; 9,954,955; 9,869,762; 9,753,121; 9,689,967; 9,599,702; 9,575,160; 9,146,898; 9,036,026; 8,027,029; 8,013,780; 7,408,627; 7,405,812; 7,379,163; 7,379,100; 7,375,803; 7,352,454; 7,340,077; 7,321,111; 7,310,431; 7,283,213; 7,212,663; 7,203,356; 7,176,438; 7,157,685; 7,053,357; 6,919,549; 6,906,793; 6,876,775; 6,710,770; 6,690,354; 6,678,039; 6,674,895 and/or 6,587,186, and/or U.S. Publication Nos. US-2019-0339382; US-2018-0231635; US-2018-0045812; US-2018-0015875; US-2017-0356994; US-2017-0315231; US-2017-0276788; US-2017-0254873; US-2017-0222311 and/or US-2010-0245066, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular sensing system, the vehicular sensing system comprising:
   a first set of sensors disposed at a first rear portion of a vehicle equipped with the vehicular sensing system, wherein the first set of sensors comprises a plurality of first sensors, and wherein each first sensor of the first set of sensors has a respective first field of sensing that extends exterior and at least rearward of the vehicle;
   a second set of sensors disposed at a second rear portion of the vehicle that is above the first rear portion of the vehicle, wherein the second set of sensors comprises a plurality of second sensors, and wherein each second sensor of the second set of sensors has a respective second field of sensing that extends exterior and at least rearward of the vehicle;
   wherein the respective first field of sensing of at least one first sensor of the plurality of first sensors at least partially overlaps the respective second field of sensing of at least one second sensor of the plurality of second sensors;
   an electronic control unit (ECU) comprising electronic circuitry and associated software;
   wherein the electronic circuitry of the ECU comprises a data processor for (i) processing sensor data captured by first sensors of the first set of sensors and (ii) processing sensor data captured by second sensors of the second set of sensors to detect presence of objects exterior and at least rearward of the vehicle;
   wherein the vehicular sensing system, responsive at least in part to processing at the ECU of sensor data captured by the first sensors of the first set of sensors and by the second sensors of the second set of sensors, detects the objects that are located within the at least partially overlapping fields of sensing of the at least one first sensor and the at least one second sensor; and
   wherein the vehicular sensing system, responsive to detecting the objects that are located within the at least partially overlapping fields of sensing, determines three-dimensional locations of the detected objects relative to the vehicle.

2. The vehicular sensing system of claim 1, wherein each first sensor of the first set of sensors comprises an ultrasonic sensor.

3. The vehicular sensing system of claim 2, wherein the first set of sensors comprises at least four first sensors arranged along the first rear portion of the vehicle horizontally relative to the ground.

4. The vehicular sensing system of claim 1, wherein each second sensor of the second set of sensors comprises an ultrasonic sensor.

5. The vehicular sensing system of claim 4, wherein the second set of sensors comprises at least four second sensors arranged along the second rear portion of the vehicle horizontally relative to the ground.

6. The vehicular sensing system of claim 1, further comprising a third set of sensors disposed at rear side regions of the vehicle, wherein the third set of sensors comprises a plurality of third sensors, and wherein each third sensor of the third set of sensors is disposed at a height above the first set of sensors and below the second set of sensors.

7. The vehicular sensing system of claim 6, wherein the third set of sensors comprises a right-side third sensor disposed at a right-side rear region of the vehicle, and wherein the third set of sensors comprises a left-side third sensor disposed at a left-side rear region of the vehicle, and wherein a field of sensing of the right-side third sensor at least partially overlaps with a field of sensing of the left-side third sensor.

8. The vehicular sensing system of claim 1, wherein the vehicular sensing system detects the objects using triangulation based on the at least partially overlapping fields of sensing.

9. The vehicular sensing system of claim 1, wherein one or more second sensors of the second set of sensors has a field of sensing that has a principal axis extending rearward from the vehicle at an angle less than 90 degrees and at an angle greater than 0 degrees relative to a rear surface of the vehicle.

10. The vehicular sensing system of claim 1, wherein one or more second sensors of the second set of sensors has a field of sensing that has a vertical dimension perpendicular to the ground and a horizontal dimension parallel to the ground, and wherein the vertical dimension is greater than the horizontal dimension.

11. The vehicular sensing system of claim 10, wherein the second set of sensors comprises at least three second sensors disposed along the second rear portion of the vehicle.

12. The vehicular sensing system of claim 1, wherein one or more first sensors of the first set of sensors has a field of sensing that has a vertical dimension perpendicular to the ground and a horizontal dimension parallel to the ground, and wherein the vertical dimension is greater than the horizontal dimension.

13. The vehicular sensing system of claim 12, wherein the first set of sensors comprises at least three first sensors disposed along the second rear portion of the vehicle.

14. The vehicular sensing system of claim 1, wherein the first rear portion of the vehicle comprises a rear bumper of the vehicle.

15. The vehicular sensing system of claim 1, wherein the second rear portion of the vehicle comprises a rear roofline of the vehicle.

16. A vehicular sensing system, the vehicular sensing system comprising:
   a first set of sensors disposed at a rear bumper of a vehicle equipped with the vehicular sensing system, wherein the first set of sensors comprises a plurality of first sensors, and wherein each first sensor of the first set of sensors has a respective first field of sensing that extends exterior and at least rearward of the vehicle;
   a second set of sensors disposed at a roofline of the vehicle above the rear bumper of the vehicle, wherein the second set of sensors comprises a plurality of second sensors, and wherein each second sensor of the second set of sensors has a respective second field of sensing that extends exterior and at least rearward of the vehicle;
   wherein the respective first field of sensing of at least one first sensor of the plurality of first sensors at least partially overlaps the respective second field of sensing of at least one second sensor of the plurality of second sensors;
   an electronic control unit (ECU) comprising electronic circuitry and associated software;
   wherein the electronic circuitry of the ECU comprises a data processor for (i) processing sensor data captured by first sensors of the first set of sensors and (ii) processing sensor data captured by second sensors of the second set of sensors to detect presence of objects exterior and at least rearward of the vehicle;

wherein the vehicular sensing system, responsive at least in part to processing at the ECU of sensor data captured by the first sensors of the first set of sensors and by the second sensors of the second set of sensors, detects objects that are located within the at least partially overlapping fields of sensing of the at least one first sensor and the at least one second sensor; and wherein the vehicular sensing system, responsive to detecting the objects that are located within the at least partially overlapping fields of sensing, determines three-dimensional locations of the detected objects relative to the vehicle.

17. The vehicular sensing system of claim 16, wherein each first sensor of the first set of sensors comprises an ultrasonic sensor.

18. The vehicular sensing system of claim 17, wherein the first set of sensors comprises at least four first sensors arranged along the rear bumper of the vehicle horizontally relative to the ground.

19. The vehicular sensing system of claim 16, wherein each second sensor of the second set of sensors comprises an ultrasonic sensor.

20. The vehicular sensing system of claim 19, wherein the second set of sensors comprises at least four second sensors arranged along the roofline of the vehicle horizontally relative to the ground.

21. A vehicular sensing system, the vehicular sensing system comprising:

a first set of ultrasonic sensors disposed at a first rear portion of a vehicle equipped with the vehicular sensing system, wherein the first set of ultrasonic sensors comprises a plurality of first sensors, and wherein each first sensor of the first set of ultrasonic sensors has a respective first field of sensing that extends exterior and at least rearward of the vehicle;

a second set of ultrasonic sensors disposed at a second rear portion of the vehicle that is above the first rear portion of the vehicle, wherein the second set of ultrasonic sensors comprises a plurality of second sensors, and wherein each second sensor of the second set of ultrasonic sensors has a respective second field of sensing that extends exterior and at least rearward of the vehicle;

a third set of ultrasonic sensors disposed at rear side regions of the vehicle, wherein the third set of ultrasonic sensors comprises a plurality of third sensors, and wherein each third sensor of the third set of ultrasonic sensors is disposed at a height above the first set of ultrasonic sensors and below the second set of ultrasonic sensors, and wherein each third sensor of the third set of ultrasonic sensors has a respective third field of sensing that extends exterior and at least rearward of the vehicle;

wherein the respective first field of sensing of at least one first sensor of the plurality of first sensors at least partially overlaps the respective second field of sensing of at least one second sensor of the plurality of second sensors, and wherein the respective first field of sensing of the at least one first sensor of the plurality of first sensors at least partially overlaps the respective third field of sensing of at least one third sensor of the plurality of third sensors;

an electronic control unit (ECU) comprising electronic circuitry and associated software;

wherein the electronic circuitry of the ECU comprises a data processor for (i) processing sensor data captured by first sensors of the first set of ultrasonic sensors, (ii) processing sensor data captured by second sensors of the second set of ultrasonic sensors, and (iii) processing sensor data captured by third sensors of the third set of ultrasonic sensors to detect presence of objects exterior and at least rearward of the vehicle;

wherein the vehicular sensing system, responsive at least in part to processing at the ECU of sensor data captured by the first sensors of the first set of ultrasonic sensors, by the second sensors of the second set of ultrasonic sensors, and by the third sensors of the third set of ultrasonic sensors, detects objects that are located within the at least partially overlapping fields of sensing of the at least one first sensor, the at least one second sensor, and the at least one third sensor; and wherein the vehicular sensing system, responsive to detecting the objects that are located within the at least partially overlapping fields of sensing, determines three-dimensional locations of the detected objects relative to the vehicle.

22. The vehicular sensing system of claim 21, wherein the third set of sensors comprises a right-side third sensor disposed at a right-side rear region of the vehicle, and wherein the third set of sensors comprises a left-side third sensor disposed at a left-side rear region of the vehicle, and wherein a field of sensing of the right-side third sensor at least partially overlaps with a field of sensing of the left-side third sensor.

23. The vehicular sensing system of claim 21, wherein the vehicular sensing system detects the objects using triangulation based on the at least partially overlapping fields of sensing.

* * * * *

UNITED STATES PATENT AND TRADEMARK OFFICE
CERTIFICATE OF CORRECTION

| | | |
|---|---|---|
| PATENT NO. | : 12,007,476 B2 | Page 1 of 1 |
| APPLICATION NO. | : 17/930785 | |
| DATED | : June 11, 2024 | |
| INVENTOR(S) | : Helmut A. H. Wodrich et al. | |

It is certified that error appears in the above-identified patent and that said Letters Patent is hereby corrected as shown below:

In the Claims

Column 7
Claim 16, Lines 4-5, "detects objects" should be --detects the objects--

Column 8
Claim 21, Line 28, "detects objects" should be --detects the objects--

Signed and Sealed this
Tenth Day of December, 2024

Katherine Kelly Vidal
*Director of the United States Patent and Trademark Office*